United States Patent Office 2,880,234
Patented Mar. 31, 1959

2,880,234

ACID ADDITION PRODUCTS OF THE TETRACYCLINES

Emil J. Maxion, Queens Village, N.Y., assignor to Chase Chemical Company, Newark, N.J., a corporation of New Jersey No Drawing. Application December 10, 1954
Serial No. 474,592

12 Claims. (Cl. 260—501)

The present invention relates to new and valuable addition products obtained from tetracycline, chlortetracycline and oxytetracycline and a hydroxybenzoic or hydroxynaphthoic acid and their nuclearly substituted derivatives.

According to the present invention, the new addition products are produced in the form of precipitates or coprecipitates by combining a solution of a substance selected from the group consisting of tetracycline, chlortetracycline and oxytetracycline with a solution of a compound selected from the group consisting of a hydroxybenzoic acid, a hydroxynaphthoic acid and their nuclearly substituted derivatives and recovering the addition products thus formed and washing and drying the same. More particularly, the new addition products are obtained by adding an alkaline solution of a hydroxybenzoic or hydroxynaphthoic acid or their nuclearly substituted derivatives to a solution containing tetracycline, chlortetracycline or oxytetracycline.

The invention is illustrated by the following examples without limiting it thereto:

*Example 1*

A dilute solution of hydrochloric acid is added to a slightly alkaline solution containing tetracycline and 3-bromosalicylic acid. A yellow precipitate forms and the originally yellow solution becomes colorless. The yellow precipitate is filtered off, washed with water and air-dried. Upon dissolving the precipitate in acetone, it was found that its ultra-violet absorption spectrum was closely similar to that of a sample of tetracycline.

*Example 2*

One molar equivalent of the sodium salt of 3-bromosalicylic acid dissolved in the smallest amount of water necessary for complete solution was added to one molar equivalent of tetracycline hydrochloride also dissolved in the smallest amount of water necessary for its solution. Upon the addition being made, a yellow precipitate was obtained which was dried. When dissolved in acetone, the ultra-violet absorption spectrum was substantially the same as that of a pure sample of tetracycline.

*Example 3*

Examples 1 and 2 were carried out using 2-hydroxy-3-naphthoic acid or its sodium salt instead of 3-bromosalicylic acid. The results obtained were similar to those of Examples 1 and 2.

*Example 4*

Examples 1 and 2 were followed except that methylene-bis-1-hydroxy-2-naphthoic acid or its sodium salt was used in place of 3-bromosalicylic acid. The results obtained were similar to Examples 1 and 2.

*Example 5*

Examples 1 and 2 were followed except that methylene-bis-2-hydroxybenzoic acid or its sodium salt was used in place of 3-bromosalicylic acid. The results obtained were similar to those of Examples 1 and 2.

*Example 6*

Examples 1 to 5, inclusive, were repeated except that chlortetracycline was used instead of tetracycline or tetracycline hydrochloride. The results obtained were similar to the said examples.

*Example 7*

Examples 1 to 5, inclusive, were repeated except that oxytetracycline was substituted for tetracycline or tetracycline hydrochloride and the results obtained were similar to those of Examples 1 to 5, inclusive.

The addition products in accordance with the invention after washing and drying are in the form of a yellow powder which appear to be single compounds or in the nature of single compounds but may be considered as addition products in which the components are loosely chemically bonded. Whatever may be the exact nature of these addition products is not to be construed as a limitation upon the invention. These addition products, as produced in accordance with the present invention, may be further purified by re-crystallization or by solvent extraction and, if desired, may subsequently be separated into their individual components by usual or known chemical methods. While the addition products may, and usually are, used as such, it will be understood that there is an advantage in being able to isolate the tetracycline, chlortetracycline or oxytetracycline therefrom as, in this way, the invention provides a simple and effective procedure for obtaining such compounds from solutions containing the same. For example, the invention provides a highly effective means for recovering the tetracycline, chlortetracycline and oxytetracycline from fermentation liquors and from aqueous solutions or concentrates. The addition products are further characterized by the ability to stabilize these relatively unstable bases for particular use as medicaments. The term nuclearly substituted derivatives, as used herein, includes lower alkyl such as methyl and ethyl, aryl such as phenyl and lower alkyl substituted phenyl, halogeno, amino, nitro, and similar derivatives, and including those hydroxybenzoic and hydroxynaphthoic acids and nuclearly substituted derivatives formed by condensing the above-mentioned on a methylenic carbon to form the methylene-bis-(hydroxybenzoic, hydroxynaphthoic or nuclearly substituted hydroxybenzoic or hydroxynaphthoic) acids.

The invention is defined by the appended claims.

I claim:

1. The addition product of tetracycline and 3-bromosalicyclic acid, as produced by the process of claim 8.

2. The addition product of tetracycline and 2-hydroxy-3-naphthoic acid, as produced by the process of claim 10.

3. The addition product of tetracycline and methylene-bis-1-hydroxy-2-naphthoic acid, as produced by the process of claim 11.

4. The addition product of tetracycline and methylene-bis-2-hydroxybenzoic acid, as produced by the process of claim 12.

5. The addition product of a molar equivalent of a substance selected from the group consisting of tetracycline, chlortetracycline, and oxytetracycline with a molar equivalent of a compound selected from the group consisting of ortho-hydroxybenzoic acid, ortho-hydroxynaphthoic acid, methylene-bis-ortho-hydroxybenzoic acid, methylene-bis-ortho-hydroxynaphthoic acid, and their nuclearly substituted lower alkyl, phenyl, lower alkyl phenyl, halogen, amino, and nitro derivatives, and the sodium salts thereof, as produced by the process of claim 6.

6. A process comprising admixing under aqueous acidic conditions a molar equivalent of a substance selected from the group consisting of tetracycline, chlortetracycline and oxytetracycline with a molar equivalent of a compound selected from the group consisting of ortho-hydroxybenzoic acid, ortho-hydroxynaphthoic acid, methylene-bis-ortho-hydroxybenzoic acid, methylene-bis-ortho-hydroxynaphthoic acid, and their nuclearly substituted lower alkyl, phenyl, lower alkyl phenyl, halogen, amino, and nitro derivatives, and the sodium salts thereof, and recovering the resulting precipitated addition product of said substance with said compound.

7. A process comprising acidifying an aqueous alkaline solution containing a molar equivalent of a substance selected from the group consisting of tetracycline, chlortetracycline and oxytetracycline and a molar equivalent of a compound selected from the group consisting of ortho-hydroxybenzoic acid, ortho-hydroxynaphthoic acid, methylene-bis-ortho-hydroxybenzoic acid, methylene-bis-ortho-hydroxynaphthoic acid, and their nuclearly substituted lower alkyl, phenyl, lower alkyl phenyl, halogen, amino and nitro derivatives, and the sodium salts thereof, and recovering the resulting precipitated addition product of said substance with said compound.

8. A process comprising acidifying an aqueous alkaline solution containing equimolar equivalents of tetracycline and 3-bromosalicyclic acid, and recovering the precipitated addition product thereof.

9. A process comprising adding an aqueous solution containing a molar equivalent of sodium 3-bromosalicylate to an aqeous solution containing a molar equivalent of tetracycline hydrochloride, and recovering the resulting precipitated addition product thereof.

10. A process comprising adding an aqueous solution containing a molar equivalent of sodium 2-hydroxy 3-naphthoate to an aqueous solution containing a molar equivalent of tetracycline hydrochloride, and recovering the resulting precipitated addition product thereof.

11. A process comprising adding an aqueous solution containing a molar equivalent of sodium methylene-bis-1-hydroxy-2-naphthoate to an aqueous solution containing a molar equivalent of tetracycline hydrochloride, and recovering the resulting precipitated addition product thereof.

12. A process comprising adding an aqueous solution containing a molar equivalent of sodium methylene-bis-2-hydroxy benzoate to an aqueous solution containing a molar equivalent of tetracycline hydrochloride, and recovering the resultant precipitated addition product thereof.

References Cited in the file of this patent

UNITED STATES PATENTS

| | | |
|---|---|---|
| 2,516,080 | Sobin et al. | July 18, 1950 |
| 2,649,480 | Regna et al. | Aug. 18, 1953 |

FOREIGN PATENTS

| | | |
|---|---|---|
| 497,344 | Canada | Oct. 2, 1951 |

OTHER REFERENCES

Woodward: "J. Pharm. and Pharmacol.," vol. 4, December 1952, p. 1032.

Paul: "J. Am. Pharm. Assoc.," vol. 41 (1952), p. 50.

"Chemical Abstracts," vol. 46 (1952), p. 10280 (abstract of Sirsi), "Indian J. Med. Research," vol. 39 (1951), pp. 397–401.